Dec. 21, 1954 N. W. DESROSIER 2,697,463
APPARATUS FOR REMOVING UNDESIRABLE MATTER FROM COMESTIBLES
Filed Jan. 16, 1953 3 Sheets-Sheet 1

INVENTOR
Norman W. Desrosier
BY Burns, Doane & Benedict
ATTORNEYS

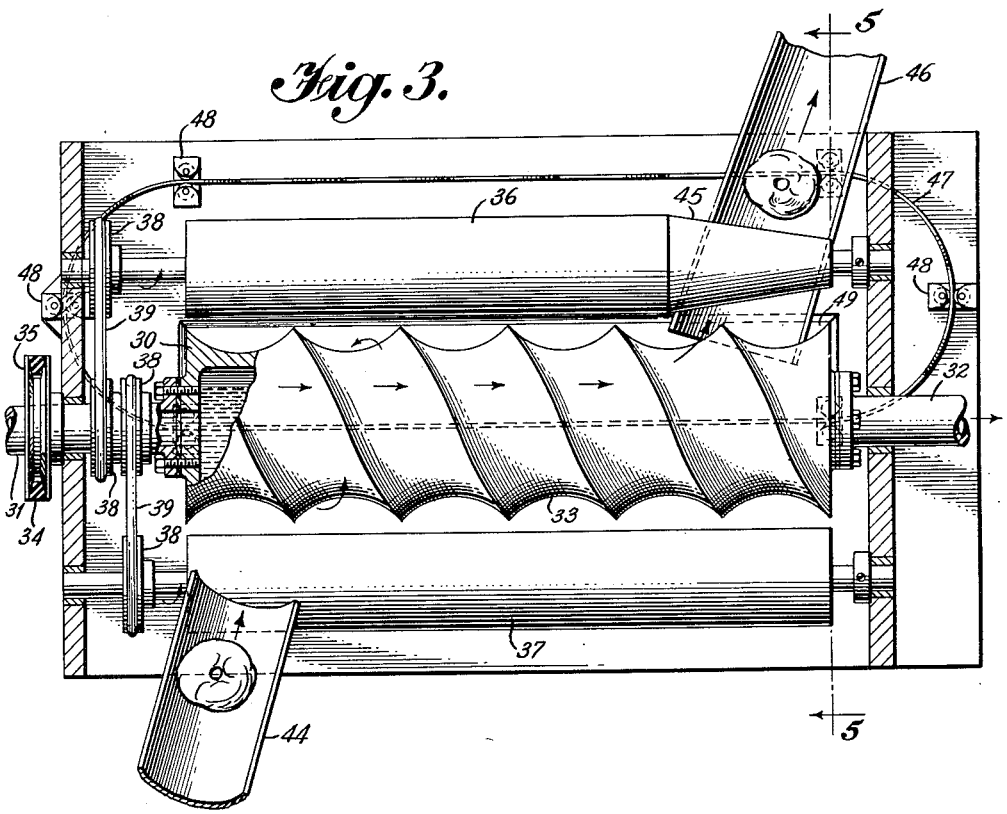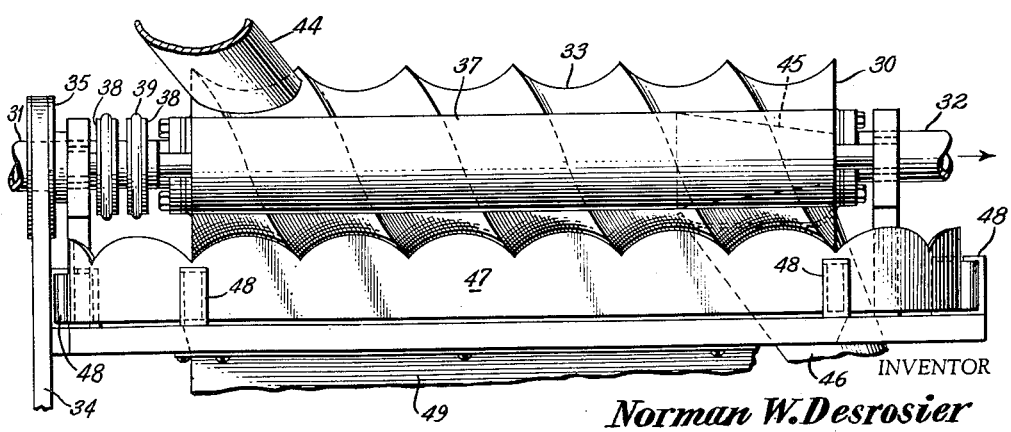

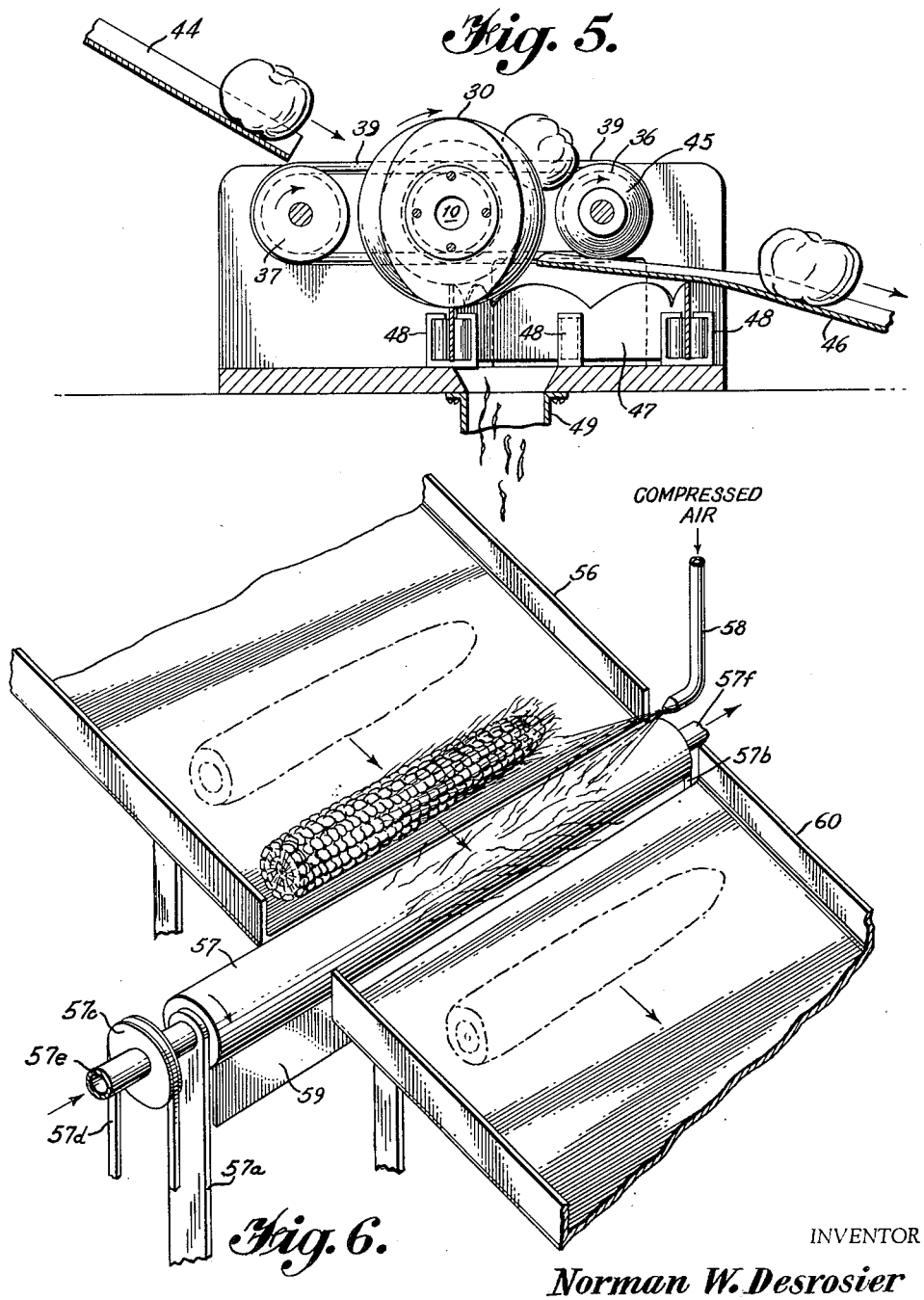

United States Patent Office 2,697,463
Patented Dec. 21, 1954

2,697,463

APPARATUS FOR REMOVING UNDESIRABLE MATTER FROM COMESTIBLES

Norman W. Desrosier, West Lafayette, Ind., assignor to Food Research and Development, Inc., Lafayette, Ind.

Application January 16, 1953, Serial No. 331,606

9 Claims. (Cl. 146—43)

This invention relates to apparatus for removing intimately associated undesirable matter from comestibles, and more particularly to apparatus for peeling fleshy fruit such as tomatoes.

The conventional steps for treating fruit prior to preserving consist of grading, washing, blanching and peeling. Of all the steps in the above-described process, the peeling step presents the most difficult problem in the treatment of tomatoes. It is also the most important of the steps where it is desired to market the more valuable whole tomatoes. When such a product is desired, it is of primary importance to obtain undamaged fruit. This can be achieved by peeling the fruit by hand, but such practice has proved so costly that many attempts have been made to find a mechanical peeler which will effectively achieve the desired result.

It is an object of this invention to provide an improved apparatus for treating moistened comestibles which will effectively remove the intimately associated undesirable matter and place said comestible in a suitable condition for preservation.

It is an additional object of this invention to provide apparatus for peeling fruit and for discharging a continuous line of peeled fruit undamaged and ready for packing.

It is a further object of this invention to provide apparatus which operates by causing the skin of a moistened fruit to be secured by freezing to a refrigerated metal surface and separating the fruit from the so-adhering skin.

It is still a further object of this invention to provide apparatus which will easily remove the skin from unripe or sunburned areas of tomatoes and which results in a minimum amount of damage to the flesh of said fruit.

Yet another object of the invention is to provide an apparatus which comprises a cold metal surface upon which moistened comestibles and associated undesirable matter may be rolled, means for refrigerating said surface to a temperature requisite to freeze said undesirable matter thereto, means for maintaining said fruit on said surface for a time sufficient to permit contact between said undesirable matter substantially in its entirety and said refrigerated surface, and means to remove said comestible from said refrigerated surface.

Another object of this invention is to provide an apparatus which comprises a rotating refrigerated metal roll upon which moistened fruit to be treated may be disposed, means to travel said fruit over the roll to such an extent that all of its skin freezes to said roll and is thereby peeled from the fruit, and means to remove the adhering skin from said refrigerated roll.

In accordance with this invention it has been discovered that the foregoing objects can be achieved by disposing a moistened comestible such as a tomato on a refrigerated metal surface, whereby the contacting surface of the comestible is frozen and caused to adhere to the refrigerated surface; and rolling said comestible over the refrigerated surface in such a manner as to remove all the skin therefrom.

In a preferred embodiment, the apparatus of this invention operates by rolling blanched and cored tomatoes down an inclined chute to a rotating refrigerated drum, which is maintaned at a temperature below about 32° F. Before reaching the drum, the tomatoes are spaced on said chute to prevent overloading of the drum. After reaching the drum, each tomato is maintained in rolling contact therewith and subjected to a slight abrading action. This is accomplished by retarding bars or balancing rolls which prevent discharge of the tomatoes from the drum for a period of time sufficient to contact the entire skin surface of the fruit with the refrigerated drum. Tomatoes are then released by said retarding bars or balancing rolls and are carried both by gravity and the rotation of the drum to a receiving means. The skins adhering to the refrigerated drum are continuously removed therefrom.

It is important in carrying out the process of this invention that the comestible be moistened prior to contact with the refrigerated surface in order that the skin may more readily freeze thereto. In addition, when it is desired to peel a fleshy fruit such as a tomato, it is preferable that the tomato first be subjected to the conventional blanching and coring operations. The blanching operation serves to loosen the skin over the entire surface of the fruit while coring, as in the case of tomatoes, removes the skin attached to the core at the stem end of the fruit. It is immaterial whether the blanching step is carried out before or after the coring step, as long as both precede the peeling operation. The term blanching refers to a short heat treatment followed by a short cooling which prevents the cooking of the flesh. The other conventional preliminary steps of grading and washing are also desirably carried out prior to peeling.

While, for convenience, the invention has been described with reference to fleshy fruit, and particularly tomatoes, it is to be understood that this adaptation is merely illustrative and does not constitute a limitation of the invention. The apparatus of this invention additionally may be employed in treating comestibles to remove undesirable matter which is intimately associated therewith. The apparatus may be used, for example, to remove contaminants from peas, to remove the silk from corn, or to a peel various other comestibles such as frankfurters or root and tuber type vegetables, when properly conditioned.

The removal of silk from corn constitutes a problem which may be resolved by employing the instant invention. An air blast is provided to lift this silk from the corn immediately prior to its contact with the refrigerated surface. The silk thus raised adheres to the refrigerated roll, leaving a substantially clean ear of corn.

The term "fleshy fruit" as used herein refers to berry fruits, such as the tomato or grape, and drupe fruits, such as peach or plum.

Several forms of the apparatus, which may be employed in the practice of this invention are shown in the accompanying drawings, in which:

Figures 3, 4 and 5 are views of another form of the apparatus, Figure 3 being view partially in top plan and partially in section of the refrigerated drum and related parts; Figure 4 being a front elevational view of the apparatus; and Figure 5 being a sectional view taken in the direction of the arrows along the line 5—5 of Figure 3.

Figure 6 is a perspective view of a modified form of apparatus adapted to remove the silk from corn.

Figure 1:
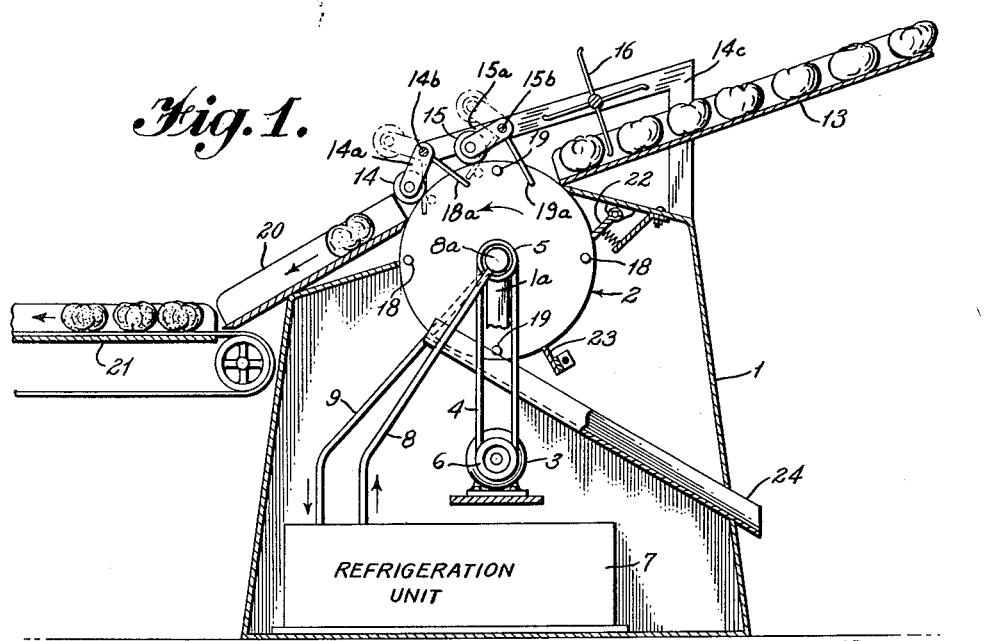
Figure 1 is a view partially in section and partially in end elevation of one form of the apparatus.
Figure 2:
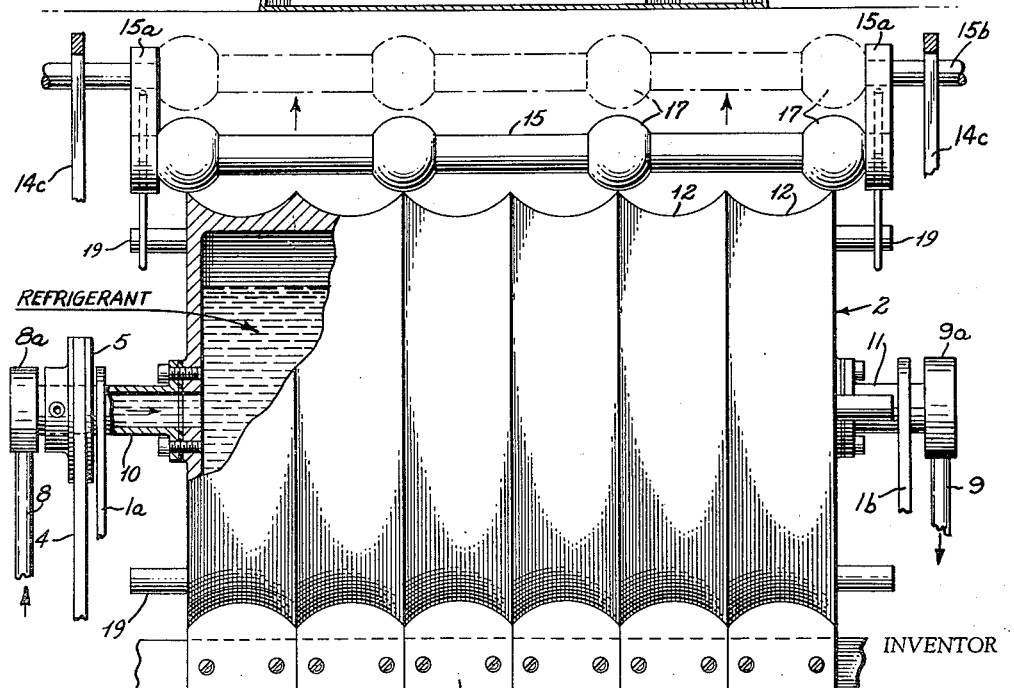
Figure 2 is an enlarged front elevation of the refrigerated drum and some of its related parts, a portion of the drum being shown broken away.

The embodiment shown in Figures 1 and 2 comprises a frame 1 which rotatably supports, by means of bearings 1a and 1b attached to the frame 1, a hollow metal drum designated in its entirety by the reference numeral 2. Such drum is provided with a suitable drive means herein illustrated as motor 3, belt 4 and pulleys 5 and 6. Drum 2 may be refrigerated as shown in Figures 1 and 2 by passing therethrough a heat transfer medium such as brine or ethylene glycol, which functions to maintain the drum temperature below 32° F. The heat transfer medium is cooled by any conventional refrigerating unit 7, and is supplied to the drum 2 through ducts 8 and 9 connected to hollow shafts 10 and 11, respectively, which open into drum 2. The ducts 8 and 9 are connected to the hollow shafts 10 and 11 by means of suitable swivel joints 8a and 9a which may, for example, be of the type shown in United States Patent No. 2,565,791 to Wagner et al., issued August 28, 1951.

Drum 2 is provided with a plurality of channels 12 extending circumferentially therearound. Concave channels 12 are provided in order to contact a greater arc on the surface of the fruit at a given instant than would be possible if a plain cylinder were employed.

As hollow drum 2 rotates in a counterclockwise direction (see Figure 1), tomatoes supplied on an inclined table or chute 13 will be deposited in channels 12 over the upper portion of the drum, until arrested by retarding bars 14 and 15. Retarding bar 14 is rotatably mounted on lever arms 14a which are pivotally mounted on shafts 14b which in turn are supported by brackets 14c attached to the frame 1. Retarding bar 15 is similarly mounted on lever arms 15a which are pivotally mounted on shafts 15b supported by the brackets 14c. Spacer 16 is rotatably supported by the brackets 14c and is provided with radially extending blades. The spacer 16 is rotated by tomatoes descending on the chute 13 and thereby prevent overloading of drum 2. Retarding bars 14 and 15 function to retain the tomatoes on the drum while they are being rolled thereon.

Bars 14 and 15 are provided with a plurality of protuberances 17 which tend to direct the tomatoes into the channels 12 of the drum 2, thereby providing the maximum surface contact within each channel. As drum 2 rotates, pins 18 and 19 projecting from the ends of the drum 2 engage lever arms 18a and 19a fixed to the lever arms 14a and 15a, respectively, and thus trip retarding bars 14 and 15 into upper positions, shown in Figures 1 and 2 by dotted lines. Pins 18 and 19 are adapted to successively raise retarding bars 14 and 15, thus enabling the tomatoes to be arrested by each of the retarding bars before being finally discharged from drum 2. When bar 14 is raised, the tomatoes are carried both by gravity and the rotation of drum 2 to discharge chute 20 and thence on conveyor 21, away from the peeler to be inspected and packed.

When the blanched and cored tomatoes contact the cold metal surface of drum 2, the moistened skin readily adheres to the drum. Retarding bars 14 and 15 together arrest the movement of the tomato over the exposed portion of drum 2 for a period of time sufficient to permit all the skin of the tomato to be contacted by the roll and frozen thereto. The accumulated skin and ice frozen to drum 2 is removed by knife scrapers 22 and 23. After drum 2 has been cleaned, the skin and ice accumulations on scrapers 22 and 23 are carried away by trough 24.

In Figures 3, 4 and 5 there is illustrated a modification of the peeler shown in Figures 1 and 2. In this embodiment tomatoes are carried over a rotating metal drum designated in its entirety by reference numeral 30. Drum 30 is mounted in a manner similar to drum 2 and is hollow and refrigerated in the same manner, hollow shafts 31 and 32 functioning respectively as inlet and outlet for the heat transfer medium.

Drum 30 is provided with helical channel 33. Drum 30 is driven in a clockwise direction (as shown in Figure 5) by means of any suitable source of power which, for purposes of illustration is here exemplified as a belt 34 and pulley 35. Balancing rolls 36 and 37 are driven by shaft 31 through pulleys 38 and belts 39.

Tomatoes to be treated are carried by chute 44 to the channeled drum or screw 30 and are balanced thereon throughout its entire length by means of rolls 36 and 37. By rotating screw 30 in a clockwise direction (as shown in Figure 5) tomatoes are carried thereby from left to right (as shown in Figures 3 and 4). Upon reaching the right end of screw 30, the tomatoes are permitted by the tapered end 45 of balancing roll 36 to be discharged onto chute 46.

Tomatoes carried in channels 12 of drum 2 or in channel 33 of screw 30 are maintained therein for a time requisite to permit the skin to be substantially completely removed. The suitable time of contact varies with the size of the fruit and the temperature down to about 0° F. Between 32° F. and 0° F. for an average sized tomato, the time should vary between about 4 and 10 seconds. Below 0° F., however, the time need be varied only with the size of the fruit to be treated. For example, for an average sized tomato, the time of contact should be greater than about six seconds, whether the temperature is 0° F. or —100° F. It might be added here that there is no lower operating temperature limit except that which may be practically attained by conventional refrigeration methods.

The optimum duration of contact may be provided by the length of channel 33, which is preferably greater than about 20 inches. The R. P. M. of the screw is desirably maintained below about 60, and is preferably between about 10 and 40. In the case of circumferentially channeled drum 2, the optimum duration of contact is provided by appropriately spacing pins 18 and 19, or by rotating drum 2 at a suitable speed requisite to raise bars 14 and 15 no oftener than about once every two seconds. Drum 2 is desirably rotated at no more than about 30 R. P. M. when the length of each channel or the minimum circumference of drum 2 is no less than 20 inches. The above values are exemplary only and are not to be construed as limiting the invention.

The accumulated skins are cleaned from the surface of screw 30 by means of a moving endless knife 47 which is adapted to move through a plurality of guides 48 in the same direction as the tomatoes, i. e. from left to right. The blade of the knife 47 conforms closely to the convolutions of the screw 30, as best shown in Figure 4. The skin and ice which is scraped from screw 30 by knife 47 is discharged through chute 49, leaving a continuously cleaned drum surface available for peeling.

Figure 6 illustrates a modified form of the peeler which is adapted to remove silk from corn, as indicated hereinabove. Individual ears of corn which have been husked are carried by inclined table 56 to a rotating refrigerated metal drum 57. The drum 57 is rotatably mounted in bearing supports 57a and 57b and is driven in the direction of the arrow by the pulley 57c and a belt 57d. Heat transfer medium may be supplied in the manner described above through inlet 57e and discharged through outlet 57f. Immediately before reaching drum 57 the silk on each ear is raised by means of a suitable blast of air emanating from jet 58. The so-raised silk will then adhere to drum 57 until removed by stationary knife 59, while each ear is discharged into trough 60.

It should be readily perceived that the device depicted in Figure 6 will be suitable for the peeling of frankfurters or the removal of contaminants from peas.

While certain specific embodiments of this invention have been herein shown and described, it will be appreciated that many changes and variations can be made in the form, construction, arrangement and operation of the various elements to suit different conditions or requirements of use without departing from the spirit and scope of this invention.

Having thus described my invention, I claim:

1. An apparatus for separating moistened, undesirable matter from intimate mixture with comestibles which comprises a frame, a hollow drum having a heat conductive curved outer surface rotatably mounted in said frame, conduit means connected to said drum to conduct a refrigerant through said drum to cool said curved outer surface to a temperature requisite to freeze the moistened, undesirable matter thereto, conveyor means positioned adjacent said drum to discharge said comestible and associated moistened, undesirable matter against said surface of said drum, means to rotate said drum, and means cooperating with said drum to separate the desired comestible from the undesirable matter frozen to the drum surface as the drum is rotated.

2. An apparatus for peeling which comprises a frame, a hollow drum having a heat conductive, curved outer surface rotatably mounted in said frame, conduit means connected to said drum to conduct a refrigerant through said drum to cool said surface to a temperature requisite to freeze thereto the skin of a moistened, unpeeled comestible, conveyor means positioned adjacent said drum to discharge moistened, unpeeled comestibles against the refrigerated surface of said drum, means for rotating said drum, means adjacent the surface of said drum to maintain the comestible in rolling contact with the surface of the rotating drum for a time sufficient to contact substantially the entire outer peel area of said comestible therewith, and means cooperating with said drum to separate the peeled comestible from frozen peel adhering to the drum surface as the drum is rotated.

3. The apparatus of claim 2 provided with means cooperating with the drum for continually removing adhering frozen peel therefrom.

4. The apparatus of claim 2 wherein the drum is provided with a circumferentially extending channel for receiving comestibles from the conveyor.

5. The apparatus of claim 4 wherein the circumferentially extending channel is helical.

6. The apparatus of claim 5 wherein the means for maintaining the comestible in rolling contact with the surface of the rotating drum comprises a pair of elongated rollers positioned on opposite sides of the drum with the longitudinal axes of said rollers being parallel to the longitudinal axis of the drum.

7. The apparatus of claim 6 wherein one of the pair of rollers is tapered at one end to permit discharge of the peeled comestible from the drum surface.

8. The apparatus of claim 2 wherein the means for maintaining the comestible in rolling contact with the surface of the rotating drum comprises a bar positioned with the longitudinal axis thereof parallel to the longitudinal axis of the drum.

9. The apparatus of claim 8 wherein the drum is provided with a plurality of circumferentially extending channels and the retaining bar is provided with a plurality of protuberances cooperating with said channels to maintain the comestibles therein, said apparatus being further provided with means to intermittently position the retaining bar to permit discharge of peeled comestibles from the surface of said drum.

References Cited in the file of this patent

UNITED STATES PATENTS

| Number | Name | Date |
|---|---|---|
| 2,097,479 | Taylor | Nov. 2, 1937 |